United States Patent Office 3,109,850
Patented Nov. 5, 1963

3,109,850
Δ⁵-ANDROSTENO-3,11,17-TRIOL AND THE ESTERS THEREOF
Albert Wettstein, Basel, and Charles Meystre, Arlesheim, Switzerland, assignors to Ciba Corporation, a corporation of Delaware
No Drawing. Filed Nov. 25, 1957, Ser. No. 698,381
Claims priority, application Switzerland Nov. 26, 1956
5 Claims. (Cl. 260—397.5)

This invention provides 3:11:17-substituted steroids of the formula

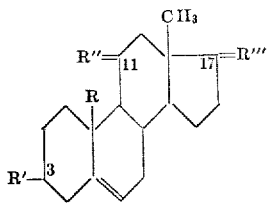

in which R represents hydrogen or a methyl group, R' represents a hydroxyl or esterified or etherified hydroxyl group, R" represents the substituent =O or

which latter substituent may be in the esterified or etherified form, and R''' represents the substituent =O,

or

which latter hydroxyl groups may be in the esterified or etherified form, and $R^{IV}$ represents a hydrocarbon radical of at most two carbon atoms. Thus, the invention relates to compounds of the Δ⁵-3-hydroxy-androstene or -19-norandrostene series, stereoisomers and racemates thereof, which are substituted in the 3-, 11-, and 17-positions. A hydroxyl group or an esterified or etherified hydroxyl group may be present in the 3-, 11- or 17-position, or an oxo group in the 11-position instead of the said free or substituted hydroxyl group or in the 17-position instead of a group of the last mentioned kind an oxo group or together with a free, esterified or etherified tertiary hydroxyl group, a methyl, ethyl, vinyl or ethinyl group. The said monovalent substituents may be present in any steric position, that is to say in the α- or β-position. The said ester residues may be those of saturated or unsaturated alkanoic, aralkanoic, cycloalkylalkanoic, cycloalkanoic acids and aromatic carboxylic acids having less than 20 carbon atoms, such as, for example, formic acid, acetic acid, propionic acid, butyric acids, valeric acids such as n-valeric acid or trimethyl-acetic acid, caproic acids such as β-trimethyl-propionic acid, oenanthic acid, caprylic acid, pelargonic acid, capric acid, undecylic acids, for example, undecylenic acid, lauric acid, myristic acid, palmitic acid or stearic acids, for example, oleic acid, cyclopentyl-, cyclohexyl- or phenyl-acetic acids or -propionic acids, benzoic acid, furane-2-carboxylic acid, and also dicarboxylic acids such as oxalic acid, succinic acid or glutaric acids, substituted carboxylic acids such as β-keto-carboxylic acid, for example, acetoacetic acid, propionyl-acetic acid, butyryl-acetic acid or caprinoyl-acetic acid, amino-acids etc. Instead of esters of carboxylic acids there may be present ester residues of sulfonic acids or of phosphoric acids, sulfuric acid, or hydrohalic acids. As ether residues there may be mentioned more especially those of monohydric or polyhydric aliphatic or cycloaliphatic alcohols, having less than 10 carbon atoms, such as methanol, ethanol, ethylene glycols, propylene glycols, cyclohexanol, tetrahydropyranol, benzyl alcohol or ether residues of phenols.

The invention is based on the observation that the aforesaid compounds are very highly active in promoting the elimination of sodium and are therefore of great therapeutic interest. Thus they can be used therapeutically to restore a disturbed sodium balance, especially in cases of retention of sodium, for example cases of edema and circulatory disturbances including high blood pressure.

The aforesaid compounds can be obtained
(a) By converting the Δ⁴-3-keto group in a compound of the formula

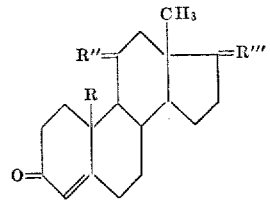

in which R, R" and R''' have the meanings given above, in known manner into a free, esterified or etherified Δ⁵-3-hydroxyl group, or (b) By hydroxylating in the 11β- or 11α-position by microbiological methods in themselves known a compound of the formula

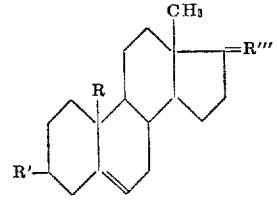

in which R and R''' have the meanings given above, and R' represents a free-, an esterified- or an etherified hydroxyl group, or (c) By the degradation of the 17-side chain by a method in itself known to a 17-hydroxyl or 17-oxo group in a compound of the formula

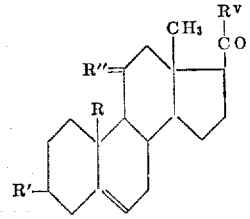

in which R, R' and R" have the meanings given above, and $R^V$ represents a methyl or oxygenated methyl group, and which compound may contain an additional double bond in the 16-position, or (d) By the degradation of the 17-side chain by a method in itself known to a 17-oxo group, if desired, with the temporary protection of the 5-double bond, in a compound of the formula

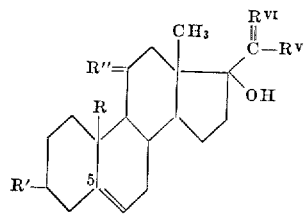

in which R, R' and R" have the meanings given above, $R^V$ represents a methyl or oxygenated methyl group, and $R^{VI}$ represents the substituent =O or

or (e) By the degradation of the 17-side chain by a method in itself known to a 17-oxo group, if desired, with the temporary protection of the 5-double bond, in a compound of the formula

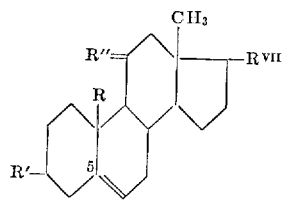

in which R, R' and R" have the meanings given above, and $R^{VII}$ represents a hydrocarbon radical.

In method (a) above there may be used as starting material, for example, a $\Delta^4$-3-oxo-androstene or $\Delta^4$-3-oxo-19-nor-androstene derivative, which contains in the 11- and 17-position an oxo group or a secondary free, esterified or etherified hydroxyl group in α- or β-position or contains in the 17-position a tertiary free, esterified or etherified hydroxyl group and also a methyl, ethyl, vinyl or ethinyl group. These starting materials are known or can be made, for example, by reacting with an alkyl- or alkinyl-metal compound a 17-oxo-androstane or 17-oxo-19-androstane compound which is saturated in the rings A and B, is oxygenated in the 3-position and is appropriately substituted in the 11-position, if required, reducing the alkinyl residue, forming the 3-oxo group, and introducing the 4-double bond. The conversion of the $\Delta^4$-3-keto group into a free, esterified or etherified $\Delta^5$-3α- or $\Delta^5$-3β-hydroxyl group is carried out by a method in itself known and especially one which is used for converting cholestenone into cholesterol. Thus, by the method of Reich and Lardon, Helv. Chim. Acta, Vol. 29, page 671 (1946), the enol acetate of the $\Delta^4$-3-ketone is brominated in the 6-position with N-bromacetamide, the bromo-ketone so obtained is converted with hydrochloric acid in methanol into the androstane-3:6-dioxo-derivative, and the latter is hydrogenated to the 3:6-dihydroxy-compound. From the latter the 6-hydroxyl group can be removed by partial splitting with hydrochloric acid in alcohol, but preferably, after acylating only the 3-hydroxyl group, the 6-hydroxyl group is removed with phosphorus oxychloride or in the form of the mesylate in pyridine. Alternatively the 3:6-diol may be dimesylated or it may be treated with a metal acetate or 3-monotosylated and subjected to the action of phosphorus oxychloride in pyridine. By other methods the enol-acetate of the $\Delta^4$-3-ketone may be treated with potassium amide in liquid ammonia (Birch, J. Chem. Soc., 1950, page 2325) or with lithium-aluminum hydride (Dauben and Eastham, J. Am. Chem. Soc., 72, page 2305 [1950]) or with sodium borohydride in aqueous alcoholic solution (Belleau and Gallagher, ibid. 73, page 4458 [1951]; Dauben and Eastham, ibid. 73, page 4463 [1951]).

In method (b) there is used as starting material, for example, a $\Delta^5$-3β-hydroxy- or $\Delta^5$-3α-hydroxy-androstene- or -19-nor-androstene-derivative of which the 3-hydroxyl group is present in the free, esterified (for example, esterified with a carboxylic acid or a hydrohalic acid) or etherified form, and is unsubstituted in the 11-position, but contains in the 17-position an oxo group, a secondary free, esterified or etherified hydroxyl group in α- or β-position or a tertiary free, esterified or etherified hydroxyl group and also a methyl, ethyl, vinyl or ethinyl group.

The above starting material is hydroxylated in the 11β- or 11α-position by a microbiological method in itself known, for example, by incubating the starting material aerobically with living micro-organisms which are capable of introducing oxygen into the 11-position. Alternatively, the enzymes may be partly or completely separated from the culture filtrate of the micro-organisms and then used in the absence of micro-organisms. The micro-organisms, for example, those of one of the groups Mucorales, Penicillium, Actinomycetes such as Streptomycetes, Aspergillus, Cunninghamella, Curvularia or Fungi Imperfecti are cultivated by a method in itself known for example, in a surface or in a submerged moving culture, which advantageously contains carbon capable of being assimilated, especially a carbohydrate. The simplest method in practice is illustrated below, without intending to limit the invention thereto: Organisms are cultivated in apparatus and under conditions similar to those known in the production of antibiotics by the so-called deep tank process. When the culture has developed one of the aforesaid starting materials is added in the form of a fine dispersion or solution, for example, in methanol, acetone or ethylene glycol and the incubation is continued. Finally the mycelium is separated, the filtrate and/or the mycelial mass is extracted, and the reaction product is isolated from the extract by a method in itself known, for example, by the demixing method, adsorption, chromatography, crystallization, conversion into a functional derivative such as a Girard compound or the like. There are mentioned below a few micro-organisms which are suitable for this method:

11α-position:
    *Rhizopus nigricans, Rh. arrhizus*
    *Aspergillus niger, Asp. ochraceus*
    *Penicillium notatum, P. adametzi, P. janthinellum*
    *Mucor mucedo*
    *Lenzites sepiaria*
    *Tilletia tritici*
    *Neurospora sitophila, N. crassa*
11β-position:
    *Curvularia lunata, C. pallascens, C. fallax,*
        *C. brachyspora*
    *Cunninghamella blakesleena*
    *Streptomyces fradiae*
    *Stigmina platani*

In method (c) the side chains of the following compounds, for example, are subjected to degradation: $\Delta^5$-20-oxo-pregnene and -19-nor-pregnene derivatives, which contain a free, esterified or etherified 3-hydroxyl group in α- or β-position, and also contain in the 11α- or 11β-position a free, esterified or etherified hydroxyl group or an 11-oxo group and bound to the 21-carbon atom exclusively hydrogen or a free, esterified or etherified hydroxyl group or an oxo group, and which may contain a double bond in the 16:17-position.

In this method the starting material is, for example, treated to introduce an oxime group into the 20-position and the 20-oxime so obtained is subjected to a Beckmann re-arrangement, for example, by treatment with an acid or acid halide, such as a sulfonic acid or a halide thereof, and advantageously in the presence of a base, especially a tertiary amine. When the starting material contains a 16:17-double bond there is obtained in this manner an acylated 17-enamine, which can easily be converted by hydroysis into the corresponding 17-ketimine and finally into the 17-ketone. When the starting material is saturated in the ring D, the reaction product obtained by the Beckmann re-arrangement is an acylated 17-amine, which can be converted by hydrolysis and treatment with nitrous acid into the corresponding 17-hydroxy-compound. These two methods are illustrated in the following formulae:

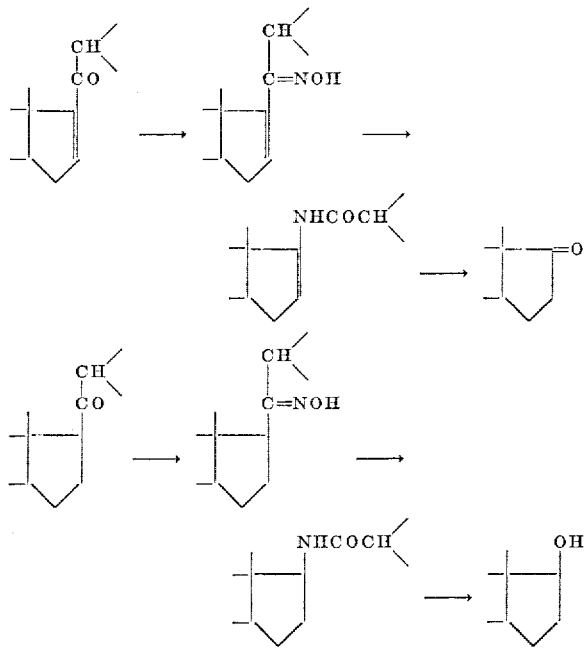

The 20-ketones saturated in ring D used as starting materials can also be degraded in one step to 17β-acetoxy-compounds, for example, by the action of organic peracids, such as perbenzoic acid or monoper-phthalic acid. In this case it is necessary temporarily to protect the 5:6-double bond, for example, by additive combination with halogen or a hydrohalic acid.

Finally, 20-ketones can also be degraded to 17-ketones in accordance with the following scheme:

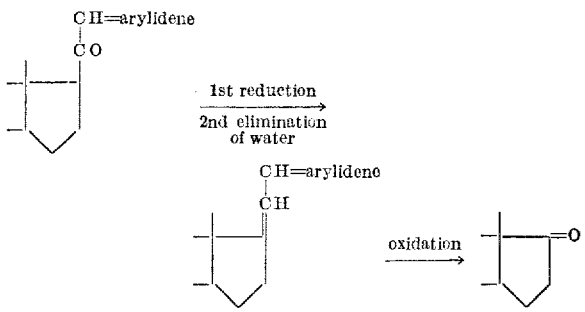

Thus, the 20-ketone is converted into the 21-arylidene derivative, for example, benzylidene derivative, then the keto group is reduced, for example, by means of a hydride of a light metal, such as lithium-aluminum hydride, lithium-boro hydride or sodium-boro hydride, water is eliminated from the resulting 20-ol, for example, by treatment with a suitable dehydrating agent, such as an organic or inorganic acid or an anhydride thereof. The elimination of water proceeds easily, for example, by boiling in a lower organic fatty acid, in the simplest cases with formic acid, acetic acid, propionic acid or butyric acid. In order to bring about oxidative degradation of the side chain-diene so obtained there may be used compounds of hexavalent chromium, such as chromic acid, potassium permanganate, or ozonisation, or oxidative degradation by way of the 17:20-glycol by means of periodic acid or lead tetra-acetate. During the oxidation step the 5:6-double bond is protected advantageously in the manner referred to above.

In method (d) the starting material, for example, a $\Delta^5$-17-hydroxy-20-oxo- or $\Delta^5$-17:20-dihydroxy-pregnene or -19-nor-pregnene derivative, which contains a free, esterified or etherified 3-hydroxyl group in α- or β-position, and in the 11α- or 11β-position a free, esterified or etherified hydroxyl group or an 11-oxo group and contains at the 21-carbon atom exclusively hydrogen or a free, esterified or etherified hydroxyl group or an oxo group, is treated to bring about degradation of the 17-side chain to the 17-oxo group. For this purpose there is used preferably an oxidising agent, for example, periodic acid or sodium bismuthate. By using these relatively mild and specific methods of oxidation protection of the 5:6-double bond can be dispensed with.

In method (e) there is used as starting material, for example a $\Delta^5$-androstene or $\Delta^5$-19-nor-androstene derivative, which contains a free, esterified or etherified 3-hydroxyl group in α- or β-position, and also contains in the 11α- or 11β-position a free, esterified or etherified hydroxyl group or an 11-oxo group and in the 17-position a saturated hydrocarbon radical or a once or several times unsaturated hydrocarbon radical. Such starting materials are, for example, 11α- or 11β-hydroxy- or 11-oxo cholesterol, -3α-cholesterol, -sitosterol or -stigmasterol. In this case the temporary protection of the 5:6-double bond as described above is advantageous, because energetic methods of oxidation are necessary for degrading these side chains, for example, oxidation with chromic acid in acid solution, or energetic oxidation with potassium permanganate.

In the $\Delta^5$-3-hydroxy-androstene and -19-nor-androstene compounds and their stereoisomers obtained by the above method hydroxyl or oxo groups in the 11- and/or 17-position can be converted into each other. For reducing oxo groups the customary methods are suitable, especially the use of hydrides of light metals, such as lithium-aluminum hydride, lithium-boro hydride or sodium boro hydride. For the dehydrogenation of hydroxyl groups to oxo groups various known methods may be used with or without protection of the 5:6-double bond (for example, by saturation with halogen or hydrogen halide or by conversion into iso-steroids), for example, oxidation with chromium trioxide in glacial acetic acid, with the chromium trioxide-pyridine complex or by one of the various known forms of the Oppenauer oxidation.

The products of the process which contain free hydroxyl and/or oxo groups can be converted by methods in themselves known into their functional derivatives, such as esters, ethers, enol-esters, enol-ethers, acetals or their corresponding thio-derivatives, for example, thio-ethers, thio-acetals and esters of thio-acids, and also hydrazones and oximes.

In the esters and enol-esters the acid residues may be those of the acids hereinbefore mentioned.

In the ethers, enol-ethers, acetals or the corresponding thio derivatives the residues may belong to the aliphatic, alicyclic, araliphatic, aromatic or heterocyclic series. Such residues are, for example, alkyl or alkylene groups, such as methyl, ethyl or ethylene groups, aralkyl groups such as benzyl or di- or tri-phenyl-methyl groups, tetrahydro-pyranyl groups or sugar residues, such as those of glucose, galactose or maltose.

For the etherification and acetalisation there are used, for example, reactive esters of the corresponding alcohols, especially those of hydrohalic acids, organic sulfonic acids or ortho-formic acid, and also free alcohols, tetra-alkyl-silicon or the like. Depending on the agent used the process is carried out in the presence of an acid or basic condensing agent or catalyst, for example, a sulfonic acid, a mineral acid such as a hydrohalic acid or a sulfuric acid, or an organic base, especially a tertiary amine.

Thioacetals and thio-enol-ethers are obtained, for example, by treatment with mercapto compounds. Thio-enol-ethers and sulfur-acetals are advantageously prepared by reacting the resulting acylic thio-acetals with heavy metal derivatives capable of forming mercaptides. As mercapto-compounds there are used more especially alkyl mercaptans, for example, methyl mercaptan, ethyl mercaptan, benzyl mercaptan or ethylene dimercaptan or the like in the presence of an acid catalyst, for example, hydrochloric acid, sulfuric acid, toluene sulfonic acid, zinc chloride or pyridine hydrochloride. Heavy metal derivatives capable of forming mercaptides are especially oxides or inorganic or organic salts, for example, chlorides, nitrates, carbonates, acetates, propionates or benzoates of mercury, cadmium, silver, copper, lead, bismuth, cobalt or nickel. The reaction is advantageously carried out with the exclusion of water and, if desired, in the presence of an organic or inorganic acid-binding agent, for example, pyridine, collidine or a carbonate, such as an alkali metal, alkaline earth metal or heavy metal carbonate. The splitting off of mercaptan from the acylic thio-acetals can be carried out by the action of heat.

By suitably selecting the reaction conditions and the proportion of the agent used it is possible to convert wholly or partially into functional derivatives hydroxyl or oxo groups present, for example, to esterify or etherify such groups.

In the compounds so obtained functionally converted hydroxyl or oxo groups can be converted into the free groups. In this manner, especially in polysubstituted derivatives, the functionally converted groups may be partially liberated. This is carried out, for example, by chemical or enzymatic hydrolysis, for example, with the use of acid or basic agents, by re-esterification, re-acetalisation or, especially in the case of araliphatic acid or alcohol residues, by hydrogenation. From oxygen-sulfur-acetals it is advantageous to prepare the cyclic semi-acetals by means of heavy metal salts, such as mercury chloride, in the presence of a basic agent, for example, cadmium carbonate. From the partially converted, such as partially esterified or etherified, derivatives obtained in this manner or obtained directly there can be obtained by subsequent functional conversion, for example, esterification or etherification, polysubstituted derivatives, especially mixed esters or ethers or ester-ethers. By suitably choosing the reaction conditions it is also possible by means of the agents referred to above to obtain the free compounds from the partially or completely converted derivatives.

Into the 17-ketones so obtained there may be introduced if desired into the 17-position a hydrocarbon radical containing at most two carbon atoms, that is to say, a methyl, ethyl, vinyl or ethinyl group. For this purpose the 17-ketone is reacted with the appropriate Grignard or alkali metal compound, for example, with methyl, or ethyl-magnesium chloride, bromide or iodide, lithium methyl, lithium ethyl, acetylene-sodium, -potassium or -lithium. These hydrocarbon radicals preferably enter the $17\alpha$-position, but $17\beta$-derivatives are also obtained. An ethinyl group can subsequently be converted by suitably choosing the conditions of reaction into a vinyl or ethyl group. The tertiary 17-hydroxyl group in the compound so obtained may be esterified likewise by known methods, easily in the case of $17\alpha$-hydroxyl compounds, under energetic conditions in the case of $17\beta$-hydroxyl compounds, for example, by means of a carboxylic anhydride in the presence of a catalyst, such as perchloric acid or paratoluene sulfonic acid or with a carboxylic acid halide and a tertiary base.

The invention also includes preparations for administration in human or veterinary medicine, which contain a compound of the aforesaid kind of the $\Delta^5$-3-hydroxyl-androstene or -19-nor-androstene series and a solid or liquid carrier suitable for medicaments. The preparations are made by methods in themselves known, for example, with the use of a pharmaceutical organic or inorganic carrier suitable for parenteral, enteral, or topical administration. As carriers there are used substances which do not react with the aforesaid compounds, for example, water, vegetable oils, benzyl alcohols, polyethylene glycols, gelatine, lactose, starches, magnesium stearate, talc, white petroleum jelly, cholesterol, or other carriers for medicaments. Especially suitable are preparations for parenteral administration, advantageously solutions and principally oily or aqueous solutions, and also suspensions, emulsions or implantation preparations. For enteral administration there may be used tablets, or dragees, and for topical application salves or creams. If desired, the preparations may be sterilized or may contain auxiliary substances, such as preserving, stabilizing, wetting or emulsifying agents, salts for controlling the osmotic pressure or buffers.

The following examples illustrate the invention:

Example 1

5 grams of cortisone-21-acetate are mixed with 5 cc. of isopropenyl acetate and 40 milligrams of para-toluene sulfonic acid. The suspension is boiled for 2 hours under reflux with the exclusion of moisture, during which the cortisone acetate gradually dissolves. The whole is then cooled, 100 milligrams of anhydrous sodium acetate are added and the mixture is evaporated in vacuo. The 3-enol-acetate obtained as residue is used without further purification for further reaction by dissolving the product in 100 cc. of methanol, cooling the solution with ice, and slowly running in a solution of 4 grams of sodium borohydride in 100 cc. of methanol and 10 cc. of an 0.1 N-solution of sodium hydroxide, while stirring well, and allowing the reaction mixture to stand at 20° C. for 4 hours. The whole is then boiled under reflux for 3 hours and a mixture of 60 cc. of concentrated sulfuric acid and a small amount of ice is cautiously added. The mixture is then concentrated in vacuo, taken up in ethyl acetate, the ethyl acetate solution is washed with water, dried and evaporated. The reaction product is dissolved in 250 cc. of dioxane, a solution of 10 grams of periodic acid in 60 cc. of water is added, the whole is allowed to stand at 20° C. for 15 hours, and the solution is then concentrated in vacuo. The suspension obtained is taken up in ethyl acetate, the ethyl acetate solutions are washed with water, dried and evaporated. The residue is a mixture of $\Delta^5$-3:11-dihydroxy-17-oxo-androstenes which can be split up by chromatography. Both isomers exhibit in the infra-red spectrum the bands characteristic of ketones, free hydroxyl groups and isolated double bonds. By allowing each of the two isomers to stand for 15 hours in a mixture of pyridine and acetic anhydride at 20° C. there is obtained the 3-monoacetate of each of these compounds. For the purpose of working up and isolating these monoacetates water is added to their solutions and concentrated in vacuo. The residue is then taken up in ethyl acetate, the ethyl acetate solutions are washed with hydrochloric acid and water, dried and evaporated, whereby there are obtained as residues the corresponding $3\alpha$- and $3\beta$-acetoxy-derivatives.

1 gram of the resulting $\Delta^5$-$3\beta$-acetoxy-$11\beta$-hydroxy-17-oxo-androstene is dissolved in 20 cc. of chloroform and 0.2 cc. of bromine is added to the solution. In a short time the solution loses its color and is then cautiously evaporated in vacuo. The residue, namely $3\beta$-acetoxy-$11\beta$-hydroxy-17-oxo-5:6-dibromo-androstane, is dissolved in 20 cc. of acetic acid of 90% strength and 2 cc. of ethylene chloride. The solution is cooled to 0° C. and a solution of 0.23 gram of chromium trioxide in 10 cc. of acetic acid of 90 percent strength is added, the whole is allowed to stand for 20 hours at 20° C., then a small amount of sodium bisulfite is added, the mixture is concentrated in vacuo with the addition of water, and the residue is taken up in ethyl acetate. The ethyl acetate solutions are washed with dilute hydrochloric acid and water, then dried and evaporated in vacuo. The residue is dissolved in 20 cc. of glacial acetic acid, the solution is agitated with small portions amounting to a total of 5 grams of zinc powder at 20° C. and the filtered solution is evaporated in vacuo. The residue is dissolved in ethyl acetate, the ethyl acetate solution is washed with dilute hydrochloric acid and water and evaporated. The $\Delta^5$-3$\beta$-acetoxy-11:17-dioxo-androstene obtained as residue (M.P. 173–175° after crystallization from acetone-ether-pentane) is dissolved in 50 cc. of methanol, 0.5 gram of sodium carbonate is added to the solution and also a small quantity of water, and the solution is boiled under reflux for one hour. Then the reaction solution is concentrated in vacuo, the residue is taken up in ethyl acetate, the ethyl acetate solutions are washed with water, dried and evaporated. The $\Delta^5$-3$\beta$-hydroxy-11:17-dioxo-androstene obtained as residue exhibits in the infra-red spectrum, after crystallization from acetone-ether, the characteristic bands of hydroxy-compounds, 5- and 6-ring ketones and the isolated double bond, M.P. 217–219°.

In an analogous manner $\Delta^5$-3$\alpha$:11$\beta$-dihydroxy-17-oxo-androstene can be converted into $\Delta^5$-3$\alpha$-hydroxy-11:17-dioxo-androstene.

The degradation of the side chain of the 3:11:17:20:21-pentol obtained by reduction with sodium borohydride to form the 17-ketone can be carried out, instead of with periodic acid with 40 grams of sodium bismuthate in a mixture of 400 cc. of acetic acid of 50 percent strength by agitation for 2 hours at 20° C., whereby the $\Delta^5$-3:11-dihydroxy-17-oxo-androstene is obtained. To isolate the product the reaction mixture is filtered, the bismuthsalt is washed with ethanol and the solution is evaporated in vacuo. The residue is taken up in ethyl acetate, the ethyl acetate solutions are washed with dilute hydrochloric acid and water, dried and evaporated. The residue is the $\Delta^5$-3:11-dihydroxy-17-oxo-androstene.

*Example 2*

1 gram of adrenosterone is mixed with 10 cc. of isopropenyl acetate and 50 milligrams of para-toluene sulfonic acid. The suspension is boiled for 20 hours under reflux with the exclusion of moisture, during which the adrenosterone gradually dissolves. The solution is cooled, 100 milligrams of anhydrous sodium acetate are added, and the mixture is evaporated in vacuo. By recrystallising the residue from methanol there is obtained the 3-enol-acetate of adrenosterone melting at 125–138° C. 1 gram of the latter compound is dissolved in 100 cc. of methanol, the solution is cooled to 0° C., and there is slowly run in, while stirring well, a solution of 1 gram of sodium borohydride in 25 cc. of methanol and 10 cc. of an 0.1 N-solution of sodium hydroxide. The reaction mixture is allowed to stand for 24 hours at 20° C., it is boiled for a short time under reflux, concentrated in vacuo, and a mixture of 15 cc. of concentrated hydrochloric acid and a small amount of ice is cautiously added. The suspension is extracted with ethyl acetate, the ethyl acetate solutions are washed with water, dried and evaporated in vacuo. The residue is a mixture of $\Delta^5$-3:11:17-trihydroxy-androstenes. The mixture so obtained is dissolved in 5 cc. of pyridine and 10 cc. of acetic anhydride and the whole is allowed to stand at 20° C. for 15 hours. Water is then cautiously added, the suspension is evaporated in vacuo, and the residue is taken up in ether. The ethereal solution is washed with dilute hydrochloric acid and water, dried and evaporated. From the residue so obtained $\Delta^5$-3:17-diacetoxy-11-hydroxy-androstene melting at 200–203° C. is recovered by recrystallisation from a mixture of ether and pentane. It has the specific rotation $[\alpha]_D^{21}$=—68° (c.=1.009 in dioxane). In the infrared spectrum it exhibits characteristic bands, inter alia, at 2.77$\mu$ (OH), 5.79$\mu$ (ester) and also at 7.30$\mu$ and 9.71$\mu$ in the fingerprint region.

80 milligrams of the diacetate so obtained are dissolved in 10 cc. of methanol. 2 cc. of water and 80 milligrams of potassium carbonate are added to the solution, and the whole is boiled for one hour under reflux and evaporated in vacuo. The suspension so obtained is extracted with ethyl acetate. The ethyl acetate solutions are washed with water, dried and evaporated. The residue is recrystallised from a mixture of acetone and pentane, whereby $\Delta^5$-3:11:17-trihydroxy-androstene melting at 227–230° C. is obtained.

1 gram of the above described $\Delta^5$-3:11-diacetoxy-11-hydroxy-androstene melting at 200–203° C. is dissolved in 10 cc. of pyridine. A solution of 500 milligrams of chromium trioxide in 30 cc. of pyridine is added to the solution at 0° C., and the whole is allowed to stand for 20 hours at 20° C. The reaction mixture is then poured into a mixture of concentrated hydrochloric acid and ice, and a small amount of sodium bisulfite solution is added. After stirring the whole for 5 minutes the suspension is extracted with ethyl acetate. The ethyl acetate solutions are washed in turn with dilute hydrochloric acid, water, dilute sodium carbonate solution and water, then dried and evaporated. There is obtained from the residue by recrystallization from a mixture of ether and pentane $\Delta^5$-3:17-diacetoxy-11-oxo-androstene melting at 173–175° C. In the infra-red spectrum it exhibits characteristic bands, inter alia, at 5.78$\mu$, 5.86$\mu$, 7.30$\mu$, 7.36$\mu$, 9.58$\mu$ and 9.75 $\mu$.

80 milligrams of the 11-keto-diacetate so obtained are hydrolysed with potassium carbonate in a manner similar to that of the 11-hydroxy-diacetate described above. After working up in a similar manner the $\Delta^5$-3:17-dihydroxy-11-oxo-androstene so obtained is recrystallized from a mixture of acetone and pentane or a mixture of ether and pentane. The pure compound melts at 230–232° C. and exhibits in the infra-red spectrum characteristic bands, inter alia, at 2.77$\mu$, 5.87$\mu$, 8.86$\mu$ and 9.46$\mu$.

*Example 3*

1 gram of the $\Delta^5$-3:11:17-trihydroxy-androstene melting at 227–230° C. and obtained as described in Example 2 is dissolved in 10 cc. of pyridine and 2 grams of succinic anhydride are added. The solution is allowed to stand for 2 hours at 40–50° C., then a small amount of water is added and the mixture is concentrated in vacuo. The residue is dissolved in ethyl acetate, the ethyl acetate solutions are washed with dilute hydrochloric acid and water, dried and evaporated. The residue is $\Delta^5$-3-succinyloxy-11:17-dihydroxy-androstene. The latter compound is dissolved in 20 cc. of chloroform, and 0.15 cc. of bromine in a small amount of chloroform is added to the solution. After a short time the solution is evaporated in vacuo, the resulting 3-succinyloxy-11:17-dihydroxy-5:6-dibromo-androstane is dissolved in 50 cc. of acetic acid of 90 percent strength and 5 cc. of ethylene chloride, a solution of 0.6 gram of chromium trioxide in 20 cc. of acetic acid of 90 percent strength is added to the solution at 0° C., and the whole is allowed to stand for 24 hours at 20° C. A small amount of sodium bisulfite solution is added to the oxidation mixture, the whole is evaporated in vacuo with the addition of water, and the residue is extracted with ethyl acetate. The ethyl acetate solutions are washed with dilute hydrochloric acid and water, dried and evaporated. The resulting 3 - succinyloxy-11:17-dioxo-5:6-dibromandrostane is dissolved in 20 cc. of glacial acetic acid and the solution is extracted with a total of 5 grams of zinc powder in small portions at 20° C., and the filtered solution is evaporated in vacuo. The residue is extracted with ethyl acetate, the ethyl acetate solutions are washed with dilute hydrochloric acid and water, dried and evaporated in vacuo. The $\Delta^5$-3-succinyloxy-11:17-dioxo-androstene so obtained is dissolved in 50 cc. of methanol, 1 gram of sodium carbonate and a small amount of water are added to the solution, and the whole is boiled for one hour under reflux. It is then concentrated in vacuo, the residue is extracted with ethyl acetate, the ethyl acetate solutions are washed with water, then dried and the solvent is removed in vacuo. The residue is $\Delta^5$-3-hydroxy-11:17-dioxo-androstene. In order to acetylate the latter compound in the 3-position it is allowed to stand with a mixture of 5 cc. of pyridine and 10 cc. of acetic anhydride for 15 hours at 20° C., and then the reaction mixture is concentrated in vacuo with the addition of water. The residue is extracted with ethyl acetate, the ethyl acetate solutions are washed with dilute hydrochloric acid and water, dried and evaporated. The residue is $\Delta^5$-3-acetoxy-11:17-dioxo-androstene, which exhibits in the infra-red spectrum characteristic bands of the 5- and 6-ring ketones, of acetate groups and of the 5:6-double bond. Hydroxyl bands are not present.

Example 4

5 grams of $\Delta^{5,16}$-3$\beta$-acetoxy-11:20-dioxo-pregnadiene are dissolved in 100 cc. of methanol and 10 cc. of pyridine and 2 grams of hydroxylamine hydrochloride are added. The solution is boiled under reflux for 30 minutes, then concentrated in vacuo and the residue is extracted with ethyl acetate. The ethyl acetate solutions are washed with dilute hydrochloric acid and water, dried and evaporated. The crude oxime so obtained is dissolved in 20 cc. of pyridine, 5 grams of para-toluene sulfonic acid chloride are added to the solution below 5° C., and the whole is stirred for 2 hours at 10° C. and a further 2 hours at 20° C. and then poured into a mixture of 50 cc. of concentrated sulfuric acid and ice. The suspension is allowed to stand for 20 hours at 0° C., it is then extracted with ethyl acetate, and the ethyl acetate solutions are washed with water, dilute sodium carbonate solution and water, dried and evaporated in vacuo. The residue so obtained is acetylated by dissolving it in 10 cc. of pyridine and 20 cc. of acetic anhydride, adding a small amount of water after 20 hours and concentrating the mixture in vacuo. The suspension so obtained is agitated with ethyl acetate, the ethyl acetate solutions are washed with dilute hydrochloric acid and water, dried and evaporated in vacuo. The residue is $\Delta^5$-3$\beta$-acetoxy-11:17-dioxo-androstene. It clearly exhibits in the infra-red spectrum an ester band, an isolated double bond, and a 6-ring- and 5-ring-ketone.

The starting material used can be prepared, for example, as follows:

5 grams of 3:11-dioxo-22a:5$\alpha$-spirostane are dissolved in 100 cc. of glacial acetic acid and a small amount of hydrogen bromide in glacial acetic acid is added. A solution of 3.8 grams of bromine in 50 cc. of glacial acetic acid is then slowly added dropwise, while stirring. The solution is allowed to stand for 24 hours at 20° C., it is then diluted with water and the mixture is extracted with ether. The ethereal solutions are washed with water, dried and evaporated in vacuo. The residue is dissolved in 100 cc. of acetone, 10 grams of sodium iodide are added to the solution, and the whole is boiled for 2 hours under reflux and concentrated in vacuo. The $\Delta^4$-2-iodo-3-ketone so obtained yields, after reductive elimination of the 2-iodine atom, $\Delta^4$-3:11-dioxo-22a-spirostene.

In order to shift the 4-double bond 8 cc. of isopropenylacetate and 50 milligrams of para-toluene sulfonic acid are added to the aforesaid $\Delta^4$-spirostene, and the solution is boiled for 2 hours under reflux with the exclusion of moisture.

By working up in the manner described in Example 1 there is obtained the 3-enol acetate of $\Delta^4$-3:11-dioxo-22a-spirostene, which is reduced with sodium borohydride in the manner described in Example 1 to form $\Delta^5$-3:11-dihydroxy-22a-spirostene.

After acetylating and splitting up the isomeric mixture, there is obtained $\Delta^5$-3$\beta$-acetoxy-11$\beta$-hydroxy-22a-spirostene, which is then oxidised to $\Delta^5$-3$\beta$-acetoxy-11-oxo-22a-spirostene.

To bring about degradation of the side chain, that is to say, the steps of isomerisation to form the furostene derivative, oxidation of the latter and splitting off of the 16-acyl residue, methods in themselves known are used, and in this manner $\Delta^{5,16}$-3$\beta$-acetoxy-11:20-dioxo-pregnadiene is obtained.

Example 5

5 grams of $\Delta^{5,16}$-3$\beta$-acetoxy-11:20-dioxo-pregnadiene are hydrogenated in 200 cc. of methanol with 0.5 gram of a 5 percent palladium-calcium carbonate catalyst at 20° C. The filtered solution is evaporated in vacuo and the residue is $\Delta^5$-3$\beta$-acetoxy-11:20-dioxo-pregnene. The latter is dissolved in 50 cc. of chloroform and treated at 0° C. with 2.6 grams of bromine. When it has lost its color the solution is evaporated in vacuo, the dibromide so obtained is treated at 0° C. with a solution of 4 grams of perbenzoic acid in 30 cc. of chloroform and then with 3 cc. of sulfuric acid of 10 percent strength in glacial acetic acid and the whole is allowed to stand for 2 days at 0° C. and then for 8 days at 20° C. in the dark. The reaction solution is then mixed with water and ether, the ethereal solution is washed with dilute sodium bicarbonate solution and water, dried and evaporated. The residue is dissolved in 100 cc. of glacial acetic acid and a total of 25 grams of zinc dust are added in portions at 20° C. while stirring. The filtered solution is then concentrated in vacuo and the residue is extracted with ethyl acetate. The ethyl acetate solutions are washed with dilute hydrochloric acid and water, dried and evaporated. The residue, which is $\Delta^5$-3:17$\beta$-diacetoxy-11-oxo-androstene, exhibits in the infra-red spectrum a distinct ester band and also the bands of an isolated double bond and of a 6-ring-ketone.

Example 6

5 grams of $\Delta^5$-3$\beta$-hydroxy-11:20-dioxo-21-benzylidene-pregnene (obtainable by reacting $\Delta^5$-3-hydroxy-11:20-dioxo-pregnene with benzaldehyde and sodium ethylate in ethanolic solution) and 15 grams of aluminum isopropylate are dissolved in 200 cc. of anhydrous isopropanol. The mixture is heated at the boil for 12 hours, and a small amount of the solvent is slowly distilled off. For the purpose of working up 800 cc. of a solution of Seignette salt are added to the reaction mixture, the suspension is agitated with ethyl acetate, and the ethyl acetate solutions are washed with water, dried and evaporated. The residue is the 21-benzylidene compound of $\Delta^5$-3:11:20-trihydroxy-pregnene and is dissolved in 100 cc. of glacial acetic acid in order to split off the 20-hydroxyl group. The solution is boiled under reflux for 6 hours, the acetic acid is then evaporated in vacuo, the residue is extracted with ethyl acetate, the ethyl acetate solutions are washed with dilute sodium bicarbonate solution and water, dried and evaporated. The resulting 21-benzylidene compound of $\Delta^{5,17(20)}$-3-acetoxy-11$\beta$-hydroxy-pregnadiene is dissolved in 50 cc. of chloroform, a solution of 2.10 grams of bromine in 20 cc. of chloroform is added to the solution, and the whole is evaporated in vacuo when it has lost its color, and the resulting 5:6-dibromide is dissolved in 200 cc. of ethyl acetate. The ethyl acetate solution is cooled to $-40°$ C. and ozone is introduced until there is a distinct slackening in the consumption of ozone. For the purpose of working up the solution is evaporated in vacuo to a small extent, 100 cc. of glacial acetic acid are added and the whole is concentrated in vacuo. The glacial acetic acid solution so obtained is agitated at 20° C. with a total of 25 grams of zinc powder, which are added in portions. The filtered solution is evaporated in vacuo, the residue is taken up in ethyl acetate, the ethyl acetate solutions are washed with dilute hydrochloric acid and water, dried and evaporated, whereby $\Delta^5$-3-acetoxy-11$\beta$-hydroxy-17-oxo-androstene is obtained.

What is claimed is:
1. The compound of the formula

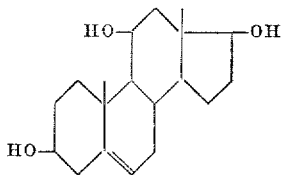

2. The 3,17-diacetate of the compound of claim 1.
3. The $\Delta^5$-3-succinyloxy-11:17-dihydroxy-androstene.
4. A compound of the formula

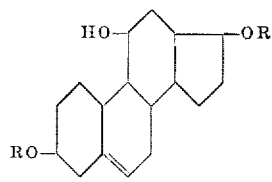

wherein R is a member selected from the group consisting of hydrogen, lower alkyl, the acyl radical of a lower aliphatic carboxylic acid having up to 20 carbon atoms, the acyl radical of a monocyclic aromatic acid, the acyl radical of a monocyclic alicyclic acid and the acyl radical of a lower monocyclic aryl aliphatic acid.

5. A compound of the formula:

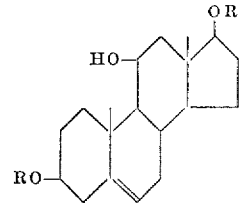

where R is the same and is selected from the group consisting of hydrogen and acetyl.

References Cited in the file of this patent
UNITED STATES PATENTS

| | | |
|---|---|---|
| 2,520,656 | Reichstein | Aug. 29, 1950 |
| 2,656,364 | Hershberg | Oct. 20, 1953 |

UNITED STATES PATENT OFFICE
CERTIFICATE OF CORRECTION

Patent No. 3,109,850                  November 5, 1963

Albert Wettstein et al.

It is hereby certified that error appears in the above numbered patent requiring correction and that the said Letters Patent should read as corrected below.

Column 13, lines 14 to 20, the formula should appear as shown below instead of as in the patent:

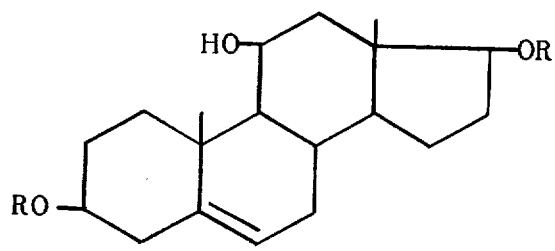

Signed and sealed this 2nd day of June 1964.

(SEAL)
Attest:

ERNEST W. SWIDER
Attesting Officer

EDWARD J. BRENNER
Commissioner of Patents